United States Patent
Kumar et al.

(10) Patent No.: US 11,157,444 B2
(45) Date of Patent: *Oct. 26, 2021

(54) GENERATING INDEX ENTRIES IN SOURCE FILES

(71) Applicant: International Business Machines Corporation, Armonk, NY (US)

(72) Inventors: Balaji S. Kumar, Bangalore (IN); Vishal G. Palliyathu, Babusapalya (IN)

(73) Assignee: International Business Machines Corporation, Armonk, NY (US)

(*) Notice: Subject to any disclaimer, the term of this patent is extended or adjusted under 35 U.S.C. 154(b) by 97 days.

This patent is subject to a terminal disclaimer.

(21) Appl. No.: 16/402,256

(22) Filed: May 3, 2019

(65) Prior Publication Data

US 2019/0258606 A1 Aug. 22, 2019

Related U.S. Application Data

(63) Continuation of application No. 14/865,366, filed on Sep. 25, 2015, now Pat. No. 10,324,895.

(51) Int. Cl.
*G06F 16/13* (2019.01)
*G06F 16/22* (2019.01)

(52) U.S. Cl.
CPC .......... *G06F 16/13* (2019.01); *G06F 16/2228* (2019.01)

(58) Field of Classification Search
CPC .... G06F 16/93; G06F 17/2247; G06F 16/248; G06F 17/212; G06F 16/13; G06F 16/22; G06F 16/2228; G06F 16/353; G06F 16/355; G06F 16/36; G06F 16/38; G06F 16/80;

(Continued)

(56) References Cited

U.S. PATENT DOCUMENTS 7,860,815 B1  12/2010  Tangirala
8,127,225 B2  2/2012  Petri (Continued)

OTHER PUBLICATIONS

Day et al., "Introduction to the Darwin Information Typing Architecture", IBM Bluemix, IBM developerWorks®, Sep. 28, 2005, 18 pages, <http://www.ibm.com/developerworks/library/x-dita1/>.

(Continued)

*Primary Examiner* — Alford W Kindred
*Assistant Examiner* — Cecile H Vo
(74) *Attorney, Agent, or Firm* — Aaron N. Pontikos; Edward J. Wixted, III

(57) ABSTRACT

An approach for generating an index in Darwin Information Typing Architecture (DITA) source files. The approach determines one or more similar index entries of a prioritized index. The approach determines a fraternal association exists between at least two of the one or more similar index entries when at least one of the one or more similar index entries occur with one or more similar high priority index entries. Responsive to a determination that a fraternal association exists between at least two of the one or more similar index entries, the approach determines whether an inheritance from a parent exists. The approach determines based, at least in part, on whether a fraternal association exists and whether an inheritance from a parent exists, a Darwin Information Typing Architecture (DITA) index.

17 Claims, 3 Drawing Sheets

(58) Field of Classification Search
CPC ... G06F 16/9024; G06F 16/951; G06F 17/211
USPC .......... 707/694, 999.101, E17.006, E17.089,
707/737, 791, 803, 999.001, 999.002,
707/999.104
See application file for complete search history.

(56) References Cited

U.S. PATENT DOCUMENTS

| | | | |
|---|---|---|---|
| 8,255,386 B1* | 8/2012 | Annau | G06F 16/22 707/711 |
| 8,381,095 B1 | 2/2013 | Fischer | |
| 8,756,232 B1 | 6/2014 | Ringhiser et al. | |
| 8,843,821 B2 | 9/2014 | Tran | |
| 9,542,360 B2 | 1/2017 | Tran | |
| 2003/0037312 A1 | 2/2003 | Czech | |
| 2007/0277101 A1 | 11/2007 | Barber et al. | |
| 2009/0210861 A1 | 8/2009 | Alupului | |
| 2011/0113327 A1 | 5/2011 | Hagelund | |
| 2012/0221593 A1 | 8/2012 | Trese et al. | |
| 2013/0117660 A1* | 5/2013 | Fischer | G06F 40/143 715/234 |
| 2013/0282730 A1* | 10/2013 | Gherman | G06F 16/40 707/741 |
| 2014/0046949 A1 | 2/2014 | Bloomfield | |
| 2014/0195896 A1 | 7/2014 | Eaten | |
| 2015/0269154 A1* | 9/2015 | Bhagavan | G06F 16/152 707/750 |
| 2017/0091207 A1* | 3/2017 | Kumar | G06F 16/2228 |

OTHER PUBLICATIONS

Palliyathu et al., "Dynamic generation of index entries in DITA source files", IBM India, downloaded on May 1, 2015, 24 pages, <http://www.stc-india.org/conferences/2014/presentations/Dynamic%20generation%20of%20index%20entries%20in%20DITA%20source%20files%20-%20Vishal%20George%20Palliyathu%20and%20Balaji%20S.pdf>.

"Darwin Information Typing Architecture", Wikipedia, the free encyclopedia, last modified on Mar. 13, 2015, 6 pages, (http://en.wikipedia.org/wiki/Darvvin_Information_Typing_Architecture>_.

"IBM Microelectronics Innovates with a DITA-based Information Strategy", Quark, quarksoftwareinc, uploaded on Nov. 10, 2011, 4 pages, <https://www.youtube.com/watch?v=2C4gPnRkLCM> _.

"Optimizing DITA for Translations", DITA XML.org, Wiki page, Submitted by jhackos on Mar. 13, 2008, last updated on Mar. 6, 2009, 2 pages, <http://dita.xml.org/wiki/optimizing-dita-for-translations>.

"XSLT process for automated indexing of DITA topic file sets", IP.com Disclosure No. IPCOM000195311D, Publication Date: Apr. 29, 2010, 6 pages, <http://priorart.ip.com/IPCOM/000195311>.

IBM, "List of Patent Applications Treated as Related", Appendix P, Dated May 2, 2019, 2 pages.

* cited by examiner

GENERATING INDEX ENTRIES IN SOURCE FILES

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE: [Palliyathu, et al., "Dynamic generation of index entries in DITA source files", presented on Dec. 6, 2014, 24 pages].

BACKGROUND

The present invention relates generally to Darwin Information Typing Architecture (DITA), and more particularly, to generating index entries in DITA source files based on fraternal affinity and inheritance.

DITA is the industry standard on technical communication and can be utilized in diverse domain applications for stand alone documents, online information centers, embedded assistance, or customized run time generation of help systems. DITA is an authoring paradigm that provides a framework to create, build, and deliver complex technical information sets. As the adoption of DITA by enterprises increases, the complexity of technical communication problems and costs of solutions also increases. Typically, the markup and generation on index entries, which is time consuming, resource intensive and performed manually, is a pivotal challenge in DITA. To create and continually refine index entries, a seasoned editor has to regularly monitor and manually fine-tune the index entries.

SUMMARY

Aspects of the present invention provide a method, computer program product, and a computer system for generating an index in Darwin Information Typing Architecture (DITA) source files, in accordance with an embodiment of the present invention. The method includes determining, by one or more computer processors, one or more similar index entries of a prioritized index. The method includes determining, by one or more computer processors, a fraternal association exists between at least two of the one or more similar index entries when at least one of the one or more similar index entries occur with one or more similar high priority index entries. Responsive to a determination that a fraternal association exists between at least two of the one or more similar index entries, the method includes determining, by one or more computer processors, whether an inheritance from a parent exists. The method includes determining, by one or more computer processors, based, at least in part, on whether a fraternal association exists and whether an inheritance from a parent exists, a Darwin Information Typing Architecture (DITA) index.

DETAILED DESCRIPTION

Embodiments of the present invention recognize a challenge in DITA can be marking up and generating index entries, which may be time consuming, resource intensive, and performed manually.

Embodiments of the present invention provide the capability to generate and rank entries in DITA source files based on fraternal affinity and inheritance. Embodiments of the present invention provide the capability to determine DITA index as described below with references to FIGS. 1-3.

Implementation of such embodiments may take a variety of forms, and exemplary implementation details are discussed subsequently with reference to the Figures.

Figure 1:
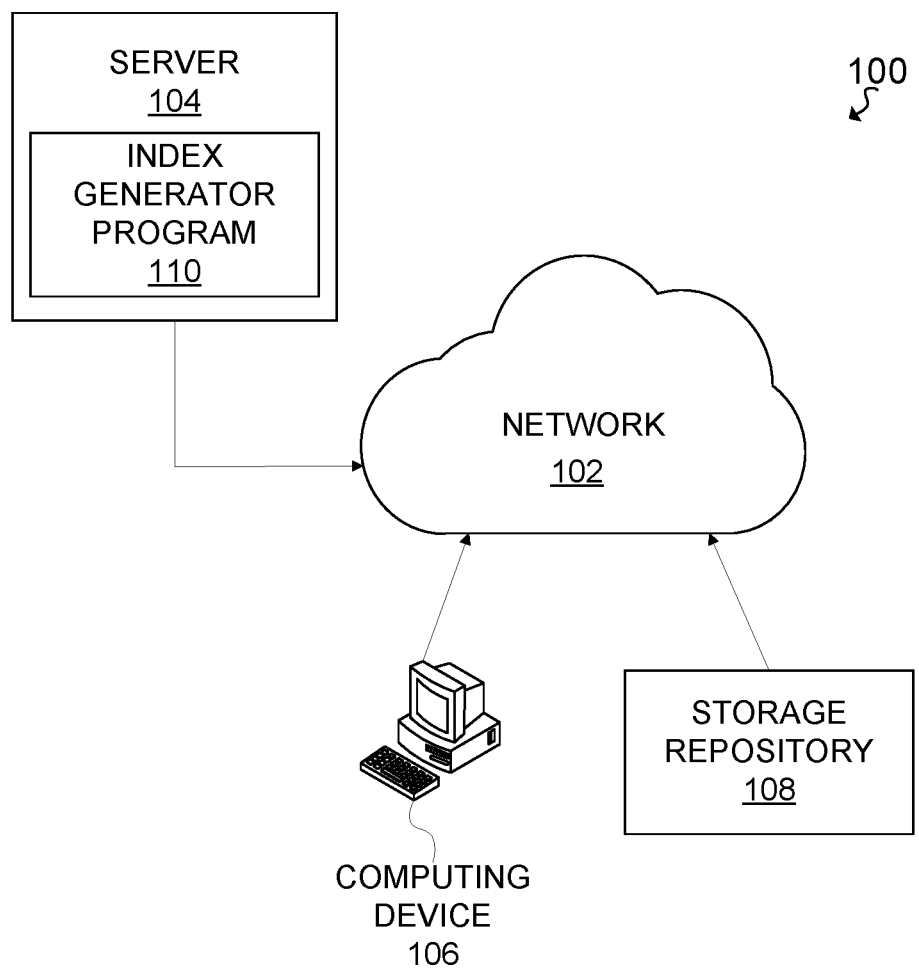
FIG. 1 is a functional block diagram illustrating a data processing environment, in accordance with an embodiment of the present invention.

FIG. 1 is a functional block diagram illustrating a data processing environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes network 102, server 104, which operates index generator program 110, computing device 106, and storage repository 108.

In one embodiment, network 102 can be, for example, a local area network (LAN), a telecommunications network, a wide area network (WAN), such as the Internet, a virtual local area network (VLAN), or any combination that can include wired, wireless, or fiber optic connections. Network 102 can also include wire cables, wireless communication links, fiber optic cables, routers, switches and/or firewalls. Network 102 interconnects server 104, computing device 106, and storage repository 108. In general, network 102 can be any combination of connections and protocols capable of supporting communications between server 104, computing device 106, storage repository 108, and index generator program 110.

In one embodiment, server 104 is a web-based server hosting index generator program 110, in accordance with an embodiment of the present invention. In one embodiment, server 104 can be a web server, a blade server, a mobile computing device, a laptop computer, a tablet computer, a netbook computer, a personal computer (PC), a desktop computer, or any programmable electronic device or computing system capable of receiving and sending data, via network 102, and performing computer-readable program instructions. In another embodiment, server 104 can be a data center, consisting of a collection of networks and servers providing an IT service, such as virtual servers and applications deployed on virtual servers, to an external party. In another embodiment, server 104 represents a computing system utilizing clustered computers and components (e.g., database server computer, application server computers, etc.) that act as a single pool of seamless resources, such as in a cloud computing environment, when accessed within data processing environment 100.

In one embodiment, server 104 includes index generator program 110 to generate and rank entries in DITA source files based, at least in part, on fraternal affinity and inheritance. In one embodiment, inheritance refers to when an object, class, or class of objects is based on, or derived from, another object or class. In one embodiment, inheritance is a way to form new program module classes using classes that have already been defined. DITA is designed around the principle of inheritance. The DITA base content model shows that even the three base information types (concept, task and reference) evolve from the topic proto information type, and share a common base structure whose characteristics they inherit. In single inheritance, sub-classes inherit the features of a single super class. Multiple Inheritance allows a class to have more than one super class and to inherit features from all parent class. A class acquires the properties of another class. In one embodiment, fraternal affinity (i.e., fraternal association) refers to two or more subclasses, derived classes, heir classes, or child classes that are modular, derivative classes that inherit one or more language entities from one or more other classes (called super-classes, base classes, or parent classes), and that are related through shared similarities. The semantics of class inheritance vary from language to language, but commonly the subclass automatically inherits the instance variables and member functions of its superclasses. In an embodiment, index generator program 110 receives one or more files, such as DITA source files or variable files. Index generator program 110 extracts from the one or more files DITA data information such as verbs, gerunds, nouns, and command entries between <cmd></cmd> tags. Having extracted the DITA data information, index generator program 110 generates a gerund-noun listing with no index hierarchy. On the generated gerund-noun listing, index generator program 110 determines a prioritized index on the gerund-noun listing by prioritizing index entries as primary index entries within a DITA schema (i.e. the concept topic type files, the task topic type files, and the reference topic type files). In an embodiment, index generator program 110 prioritizes nouns as the primary index entry on the concept topic type files. In an embodiment, index generator program 110 prioritizes verbs and gerunds as the primary index entry on the task topic type files. In an embodiment, index generator program 110 prioritizes commands (i.e. entries between <cmd></cmd> tags) as the primary index entry on the reference topic type files. Having generated a prioritized index, index generator program 110 determines similar index entries within their respective DITA schema. In one embodiment, index generator program 110 may determine index entries are similar where the index entries include at least one or more of the same noun, verb, and/or command. For example, index generator program 110 may determine a first index entry, such as "Starting your WonderCar using Key Command", as similar to a second index entry, such as "Starting your WonderCar using Push Ignition Command", as both the first index entry and the second index entry share the same verb (i.e., Starting) and the same noun (i.e., WonderCar). Index generator program 110 determines whether fraternal associations exist between similar index entries. Where fraternal associations exist, index generator program 110 determines whether inheritance from a parent exists. Where fraternal associations do not exist, index generator program 110 assigns a level 3 value to the index entry. Where fraternal association and inheritance from a parent exists, index generator program 110 assigns a level 1 value to the index entry. Where fraternal association exists, but inheritance from a parent does not exist, index generator program 110 assigns a level 2 value to the index entry. Having assigned values to the index entries, index generator program 110 determines a DITA index based, at least in part, on the assigned values to the index entries.

In one embodiment, index generator program 110 operates on a central server, such as server 104. Index generator program 110 can be utilized by one or more computing devices, such as computing device 106, via a mobile application downloaded from the central server or a third-party application store, and can be executed on the one or more computing devices. In another embodiment, index generator program 110 can be a software-based program, downloaded from a central server, such as server 104, and installed on one or more computing devices, such as computing device 106. In yet another embodiment, index generator program 110 can be utilized as a software service provided by a third-party cloud service provider (not shown).

In one embodiment, a user, such as a developer, operates computing device 106 that can be, for example, a desktop computer, a laptop computer, a tablet computer, a personal digital assistant (PDA), a smart phone, a thin client, or any other electronic device or computing system capable of communicating with server 104 through network 102. For example, computing device 106 may be a laptop computer capable of connecting to a network, such as network 102, to access and utilize index generator program 110 hosted on server 104. In other embodiments, computing device 106 can be any suitable type of mobile device capable of running mobile applications, such as a smart phone, tablet, slate, or any type of device that runs a mobile operating system. In yet other embodiments, computing device 106 can represent a virtual instance operating on a computing system utilizing clustered computers and components (e.g., database server computer, application server computers, etc.) that act as a single pool of seamless resources when accessed within data processing environment 100.

In yet another embodiment, computing device 106 can include a user interface (not shown) for providing an end user with the capability to interact with index generator program 110. For example, an end user may access index generator program 110 through the user interface to enable index generator program 110 to operate on the end user's device. A user interface refers to the information (such as graphic, text, and sound) a program presents to a user and the control sequences the user employs to control the program. In one embodiment, the user interface can be a graphical user interface (GUI). A GUI may allow users to interact with electronic devices, such as a keyboard and mouse, through graphical icons and visual indicators, such as secondary notations, as opposed to text-based interfaces, or typed command labels.

In one embodiment, storage repository 108 includes the capability for storing data including, but not limited to, DITA source files, variable files, DITAMAP files, and index entry values. In some embodiments, index generator program 110 accesses, via network 102, storage repository 108 to retrieve DITA source files, variable files, DITAMAP files, and index entry values. In some embodiments, storage repository 108 contains known available revisions of the DITA source files, variable files, DITAMAP files, and index entry values. In other embodiments, index generator program 110 can distribute DITA source files, variable files, DITAMAP files, and index entry values across more than one storage repository (not shown).

In some embodiments, storage repository 108 can be a web server, a mobile computing device, a laptop computer, a tablet computer, a netbook computer, a personal computer (PC), a desktop computer, or any programmable electronic device or computing system capable of receiving, storing, and sending files and data, and performing computer readable program instructions capable of communicating with server 104 and computing device 106, via network 102. In other embodiments, storage repository 108 can represent a virtual instance operating on a computing system utilizing clustered computers and components (e.g., database server computer, application server computers, etc.) that act as a single pool of seamless resources when accessed within data processing environment 100.

Figure 2:
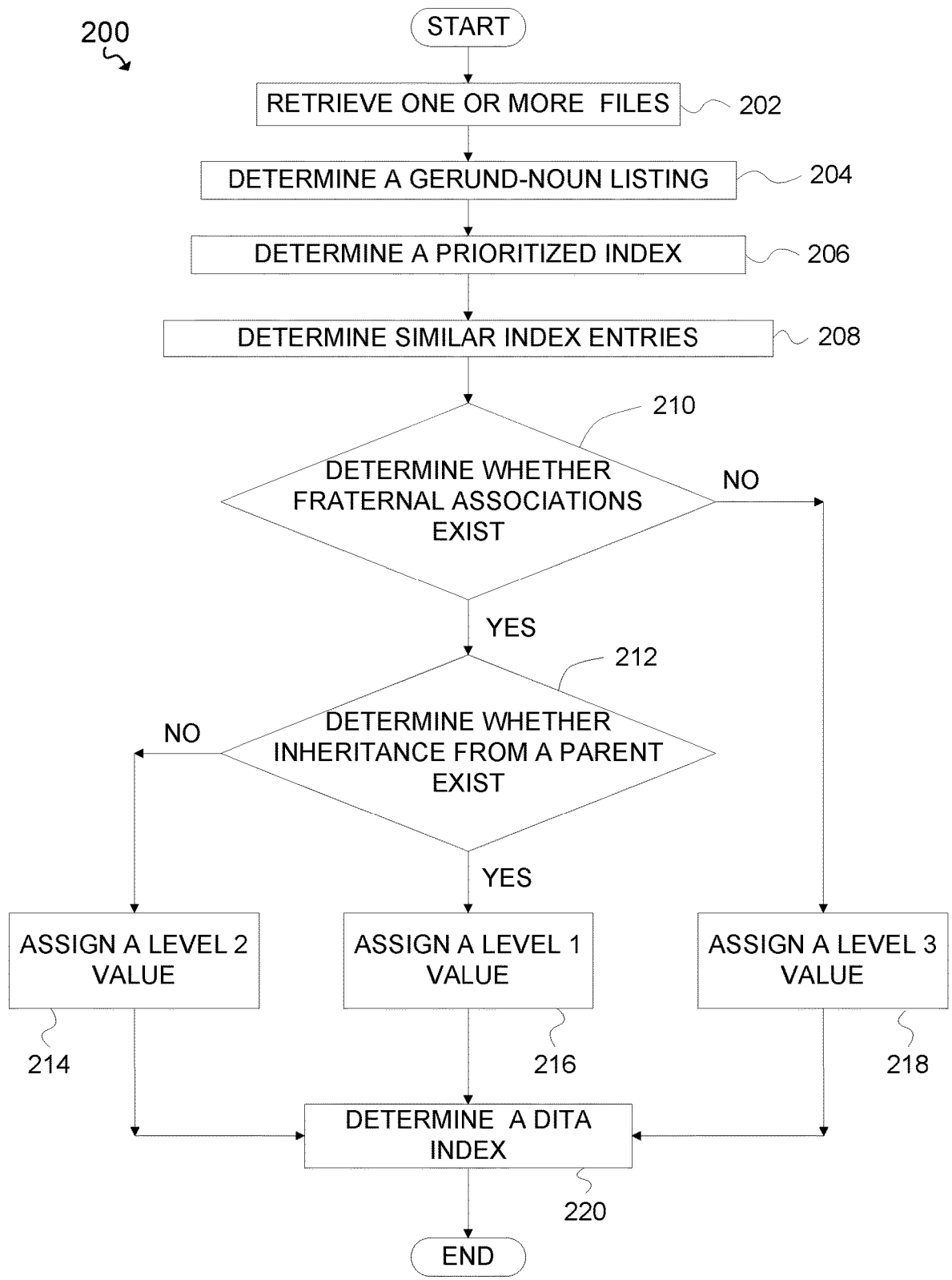
FIG. 2 is a flowchart illustrating operational steps of an index generator program, in accordance with an embodiment of the present invention.

FIG. 2 is a flowchart illustrating operational steps of index generator program 110, generally designated 200, in accordance with an embodiment of the present invention. In some embodiments discussed herein, a device, such as computing device 106, can initiate index generator program 110 by connecting to server 104 via network 102.

Index generator program 110 retrieves one or more files (202). In some embodiments, index generator program 110 retrieves one or more files, such as, but not limited to, DITA source files, variable files, and a DITAMAP file, from storage repository 108, via network 102. In other embodiments, index generator program 110 retrieves one or more files stored locally on computing device 106. In an embodiment, DITA source files can be information development source files. DITA source files may provide the capabilities for single-source publishing to Portable Document Format (PDF), HyperText Markup Language (HTML), and electronic publication (ePub). Index generator program 110 may specify one or more files, such as DITA source files, to contain different types of information, such as conceptual information, procedural steps or task information, and reference information. In an embodiment, a variable file can be a file included in product development source files and can be a listing of each of the product names as variables. The product names may be commonly used nouns. In an embodiment, the DITAMAP file contains gerund and noun information (i.e. nouns, verbs, and gerunds) in the one or more files and command information (i.e. entries between <cmd></cmd> tags) in the one or more files. In some embodiments, the entries between <cmd></cmd> tags can be nouns, verbs, or gerunds. In other embodiments, command information entries can be designated with the term "Command" (e.g. Key Command, Push Ignition Command, etc.). In an embodiment, a DITAMAP file contains a nesting of the one or more files in which the nesting comprises a parent-child relationship among the one or more files. For example, "'Starting' your 'WonderCar' using 'Key Command,'" from the DITAMAP file example discussed in paragraph [0021] below, is a child nested within the parent, "'Starting' your 'WonderCar.'"

In an embodiment, the retrieved one or more files can include a selection of tokenized gerund and noun information and command information. In an embodiment, the tokenized selection of gerund and noun information and command information can be a default tokenized selection, a pre-defined tokenized selection, or a user defined tokenized selection. In an embodiment, the tokenized selection contains a visual indicator to differentiate the tokenized selection from other text in the one or more files. The visual indicator may comprise of text that is highlighted, bolded, italicized, underlined, indicated with symbols or markings, indicated in a different font or size, or indicated by other methods known in the art. For example, a tokenized selection of a noun may comprise "WonderCar," a tokenized selection of a verb may comprise "Starting," and a tokenized selection of a command may comprise "Key Command." In an embodiment, index generator program 110 can display a DITAMAP file containing a tokenized selection of gerund and noun information and command information on a user interface (not shown). An example of a DITAMAP file, in which the one or more files contains tokenized gerund and noun information and command information, may include a "WonderCar.ditamap" file including a selection for Creating a "WonderCar," where the selection includes a plurality of sub-selections including, but not limited to, "Starting" your "WonderCar," "Driving" your "WonderCar," "Securing" your "WonderCar," and "Stopping" your "WonderCar." Each of the plurality of sub-selections include one or more tokenized selections of gerund and noun information and command information. For example, the sub-selection "Starting" your "WonderCar" may include one or more tokenized selections of gerund and noun information and command information including, but not limited to, "Starting" your "WonderCar" using "Key Command," "Starting" your "WonderCar" using "Push Ignition Command," "Starting" your "WonderCar" using your mobile application, and "Starting" your "WonderCar" using "Voice Recognition Command." In another example, the sub-selection "Driving" your "WonderCar" may include one or more tokenized selections of gerund and noun information and command information including, but not limited to, "Driving" your "WonderCar" using "Manual Mode," "Driving" your "WonderCar" using "Automatic Mode," and "Driving" your "WonderCar" using "Sport Mode." In yet another example, the sub-selection "Securing" your "WonderCar" may include one or more tokenized selections of gerund and noun information and command information including, but not limited to, "Securing" your "WonderCar" using "Biometric Sensors Command," "Securing" your "WonderCar" using third-party "Software," and "Securing" your "WonderCar" by "Locking" door locks.

Index generator program 110 determines a gerund-noun listing (step 204). In some embodiments, index generator program 110 determines a gerund-noun listing by determining the DITA data information of the one or more files. In an embodiment, the one or more files comprises DITA source files. In another embodiment, the one or more files comprises variable files. In yet another embodiment, the one or more files comprises DITA source files and variable files. In some embodiments, index generator program 110, using a parser (not shown), for example a DITA source analyzer, compiles the one or more files to generate the DITA data information. In an embodiment, the parser can be fully integrated with index generator program 110. In another embodiment, the parser can be partially integrated with index generator program 110. In yet another embodiment, the parser resides separate from index generator program 110, in which index generator program 110 can access the parser via network 102. Index generator program 110 may determine the DITA data information by differentiating the DITA data into DITA schema (i.e. concept topic type files, task topic type files, and reference topic type files), gerund and noun information of the one or more files, and command information of the one or more files.

Responsive to determining the DITA data information, index generator program 110 determines a gerund-noun listing by collating the gerund and noun information and command information of the one or more files. Index generator program 110 may collate the tokenized gerund and noun information and command information of the one or more files. In another embodiment, index generator program 110 determines a gerund-noun listing by collating the schema information, the gerund and noun information, and the command information. In an embodiment, index generator program 110 organizes a gerund-noun listing by DITA schema. In another embodiment, index generator program 110 organizes a gerund-noun listing by gerund and noun information and command information. In an embodiment, index generator program 110 collates a gerund-noun listing with no prioritization or particular ranking. In an embodiment, index generator program 110 can display the gerund-noun listing on a user interface (not shown). With reference to the above DITAMAP file example discussed in paragraph [0021], a gerund-noun listing may include "Starting, WonderCar, Driving, Key Command, Securing, Push Ignition Command, Stopping, Voice Recognition Command, Biometric Sensors Command, Manual Mode, Automatic Mode, Sport Mode, Software, and Locking."

Index generator program 110 determines a prioritized index (step 206). In an embodiment, index generator program 110 determines a prioritized index of the gerund-noun listing by assigning priority to nouns, verbs, gerunds, and commands based on the DITA schema type. In an embodiment, index generator program 110 designates the prioritized terms as high priority index entries and the remaining terms as low priority index entries, in accordance with known practices under DITA industry standards. Index generator program 110 designates nouns as high priority index entries for concept topic type files, and index generator program 110 designates verbs, gerunds, and commands as low priority index entries. Index generator program 110 designates verbs and gerunds high priority index entries for task topic type files, and index generator program 110 designates nouns and commands as low priority index entries. Index generator program 110 designate commands (i.e. entries between the <cmd></cmd> tags) as high priority index entries for reference topic type files, and index generator program 110 designates verbs, gerunds, and nouns as low priority index entries. In an embodiment, index generator program 110 can search for the <cmd></cmd> tags in the title or short description <shortdesc></shortdesc> tags. If the <cmd></cmd> tags are not found, index generator program 110 searches for the <cmd></cmd> tags in the first <p></p> tag. In an embodiment, commands can be nouns, verbs, or gerunds. In an embodiment, index generator program 110 determines a prioritized index for each of the topic type files. In another embodiment, index generator program 110 determines a prioritized index that contains a prioritization of the gerund-noun listing for each topic type file. In an embodiment, index generator program 110 can display the prioritized index on a user interface. An example of a prioritized index of a concept topic type file may include a plurality of high priority index entries, such as WonderCar, Manual Mode, Automatic Mode, Sport Mode, and Software, and a plurality of low priority index entries, such as Starting, Stopping, Driving, Securing, Locking, Key Command, Push Ignition Command, Biometric Sensors Command, and Voice Recognition Command. An example of a prioritized index of a task topic type file may include a plurality of high priority index entries, such as Starting, Driving, Securing, Stopping, and Locking, and a plurality of low priority index entries, such as WonderCar, Key, Push Ignition, Voice Recognition, Biometric Sensors, Manual Mode, Automatic Mode, Sport Mode, and Software. An example of a prioritized index of a reference topic type file may include a plurality of high priority index entries, such as Key command, Push Ignition command, Voice Ignition Command, and Biometric Sensors Command, and a plurality of low priority index entries, such as Starting, Driving, Securing, Stopping, WonderCar, Manual Mode, Automatic Mode, Sport Mode, Software, and Locking.

Responsive to determining a prioritized index, index generator program 110 determines similar index entries (step 208). Index generator program 110 determines similar index entries by grouping the low priority index entries that are similar within the prioritized index of a certain topic type file, such as the concept, task, or reference topic type files. For example, in the task topic type file, index generator program 110 determines similar index entries by grouping the low priority index entries with the noun "WonderCar." Index generator program 110 may not group similar high priority index entries to determine similar index entries.

Index generator program 110 determines whether fraternal associations exist (decision block 210). In an embodiment, index generator program 110 determines whether fraternal associations exist where similar index entries occur with similar high priority index entries. In some embodiments, index generator program 110 includes the high priority index entries of the similar index entries to determine whether fraternal associations exist. In an embodiment, index generator program 110 includes the index entries associated with the similar index entries. Index generator program 110 groups the similar high priority index entries (e.g. "Starting") containing similar index entries (e.g. "WonderCar") of the prioritized index of the respective topic type file. An example of the grouping for a prioritized index of a task topic type file may include "Starting" your "WonderCar," "Starting" your "WonderCar" using "Key Command," "Starting" your "WonderCar" using "Push Ignition Command," "Starting" your "WonderCar" using your mobile application, and "Starting" your "WonderCar" using "Voice Recognition Command."

Where index generator program 110 determines fraternal associations do not exist (decision block 210, "NO" branch), index generator program 110 assigns a level 3 value (step 218). Where index generator program 110 determines index entries (e.g. "Key Command," "Push Ignition Command," and "Voice Recognition Command") associated with similar index entries (e.g. "WonderCar") and similar high priority index entries (e.g. "Starting") of a prioritized index are unrelated, index generator program 110 assigns a level 3 value to the index entries that are not fraternally associated. In some embodiments, index generator program 110 can designate a tertiary level value as a numerical value in a point system. For example, a tertiary level value may be equivalent to 25 points. In another embodiment, index generator program 110 can designate a tertiary level value categorically, for example, index generator program 110 may designate a tertiary level value as a low priority. In an embodiment, index generator program 110 can store an index entry with a tertiary level value in storage repository 108. In another embodiment, index generator program 110 can store an index entry with a tertiary level value locally on the computing device, such as computing device 106.

Where index generator program 110 determines fraternal associations do exist (decision block 210, "YES" branch), index generator program 110 determines whether inheritance from a parent exists (decision block 212). In an embodiment, index generator program 110 determines whether the similar index entries (e.g. "WonderCar") and related similar high priority index entries (e.g. "Starting") have the same parent within the DITAMAP file.

Where index generator program 110 determines inheritance from a parent exists (decision block 212, "YES" branch), index generator program 110 assigns a level 1 value (step 216). In an embodiment, index generator program 110 assigns a level 1 value to an index entry that inherits from a parent. For example, index generator program 110 determines from WonderCar.ditamap that "'Starting' your 'WonderCar'" is a parent that has children "'Starting' your 'WonderCar' using 'Key Command,'" "'Starting' your 'WonderCar' using 'Push Ignition Command,'" "'Starting' your 'WonderCar' using your mobile application," and "'Starting' your 'WonderCar' using 'Voice Recognition Command.'" Index generator program 110 determines the index entry, "Starting," inherits from the parent, "Starting your WonderCar." Index generator program 110 assigns a level 1 value to the index entry, "Starting." In some embodiments, index generator program 110 can designate a primary level value as a numerical value in a point system. For example, a primary level value may be equivalent to 100 points. In another embodiment, index generator program 110 can designate a primary level value categorically, for example, index generator program 110 can designate a primary level value as a high priority. In an embodiment, index generator program 110 can store an index entry with a primary level value in storage repository 108. In another embodiment, index generator program 110 can store an index entry with a primary level value locally on the computing device, such as computing device 106.

Where index generator program 110 determines inheritance from a parent does not exist (decision block 212, "NO" branch), index generator program 110 assigns a level 2 value (step 214). In an embodiment, index generator program 110 assigns a level 2 value to each of the index entries in which inheritance from the parent does not exist. For example, index generator program 110 determines the index entry, "WonderCar," does not inherit from a parent (e.g. "'Starting' your 'WonderCar'") because the index entry is found in other index entries (e.g. "'Driving' your 'WonderCar,'" "'Securing' your 'WonderCar,'" or "Creating 'WonderCar'"). Index generator program 110 assigns a level 2 value to the index entry, "WonderCar." In some embodiments, index generator program 110 can designate a level 2 value as a numerical value in a point system. For example, a level 2 value may be equivalent to 50 points. In another embodiment, index generator program 110 can designate a secondary level value categorically, for example, index generator program 110 designates a secondary level value as a mid-priority. In an embodiment, index generator program 110 can store an index entry with a secondary level value in storage repository 108. In another embodiment, index generator program 110 can store an index entry with a secondary level value locally on the computing device, such as computing device 106.

Responsive to assigning values to the index entries, index generator program 110 determines a DITA index (step 220) and ends. In an embodiment, index generator program 110 retrieves the index entry values from storage repository 108. In another embodiment, index generator program 110 retrieves the index entry values stored locally on the computing device. In an embodiment, index generator program 110 determines a DITA index by organizing index entries within their topic type files (i.e. concept topic type file, task topic type file, and reference topic type file). Index generator program 110 may designate an index entry with a level 1 value as a primary index entry. Index generator program 110 may designate an index entry with a level 2 value as a secondary index entry. Index generator program 110 may designate an index entry with a level 3 value as a tertiary index entry. In some embodiments, index generator program 110 displays, on a user interface, the DITA index as a list of index entries sorted by primary index entries, secondary index entries, and tertiary index entries. In another embodiment, index generator program 110 displays, on a user interface, the DITA index as a list of index entries sorted by their level values (i.e. Level 1 value, Level 2 value, and Level 3 value, or primary level, secondary level, and tertiary level). In an embodiment, index generator program 110 displays the DITA index sorted by task topic type file, concept topic type file, or reference topic type file. Index generator program 110 may display the list of index entries of the DITA index on a window on a user interface. Index generator program 110 may display the list of index entries of the DITA index across multiple windows on a user interface. For example, the DITA index of the Task file may be located on window 1, the DITA index of the Concept file may be located on window 2, and the DITA index of the Reference file may be located on window 3. An example of a DITA index of a Task topic type file may include a primary index entry column, a secondary index entry column, and a tertiary index entry column, where the primary index entry column may include multiple entries of Starting, Driving, Securing, and Stopping, where the secondary index entry column may include multiple entries of WonderCar, and where the tertiary index entry column may include multiple entries of, for example, Key Command, Push Ignition Command, Voice Recognition Command, Manual Mode, Automatic Mode, Sport Mode, Biometric Sensors Command, Software, and Locking.

In an embodiment, index generator program 110 displays index entries not determined to be similar index entries or associated with the similar index entries, for example, "Creating 'WonderCar,'" in a separate list that a user may evaluate manually. Index generator program 110 may display these index entries in brackets. In another embodiment, index generator program 110 integrates the DITA index with the one or more files, such as the DITA source files. Index generator program 110 may use the DITA index to determine another gerund-noun listing.

In some embodiments, index generator program 110 does not create hierarchies in which a verb is a primary index entry and a secondary index entry or in which a noun is a primary index entry and a secondary index entry. In another embodiment, when a verb is a primary index entry, a noun is a secondary index entry, and a noun is a tertiary index entry, index generator program 110 precedes the tertiary index entry with a bracketed preposition (e.g. in, on, of, with, for, etc.). An example of index generator program 110 preceding the tertiary index entry with a bracketed preposition may include a primary index entry "Starting" with a secondary index entry "WonderCar" with a tertiary index entry "(with) Key Command."

In yet another embodiment, when a verb is the primary index entry, a noun is the secondary index entry, and a verb is the tertiary index term, index generator program 110 succeeds the tertiary index entry with one or more additional options in brackets. An example of index generator program 110 succeeding the tertiary index entry with one or more additional options in brackets may include a primary index entry "Securing" with a secondary index entry "WonderCar" with a tertiary index entry "Locking (door locks)."

Figure 3:
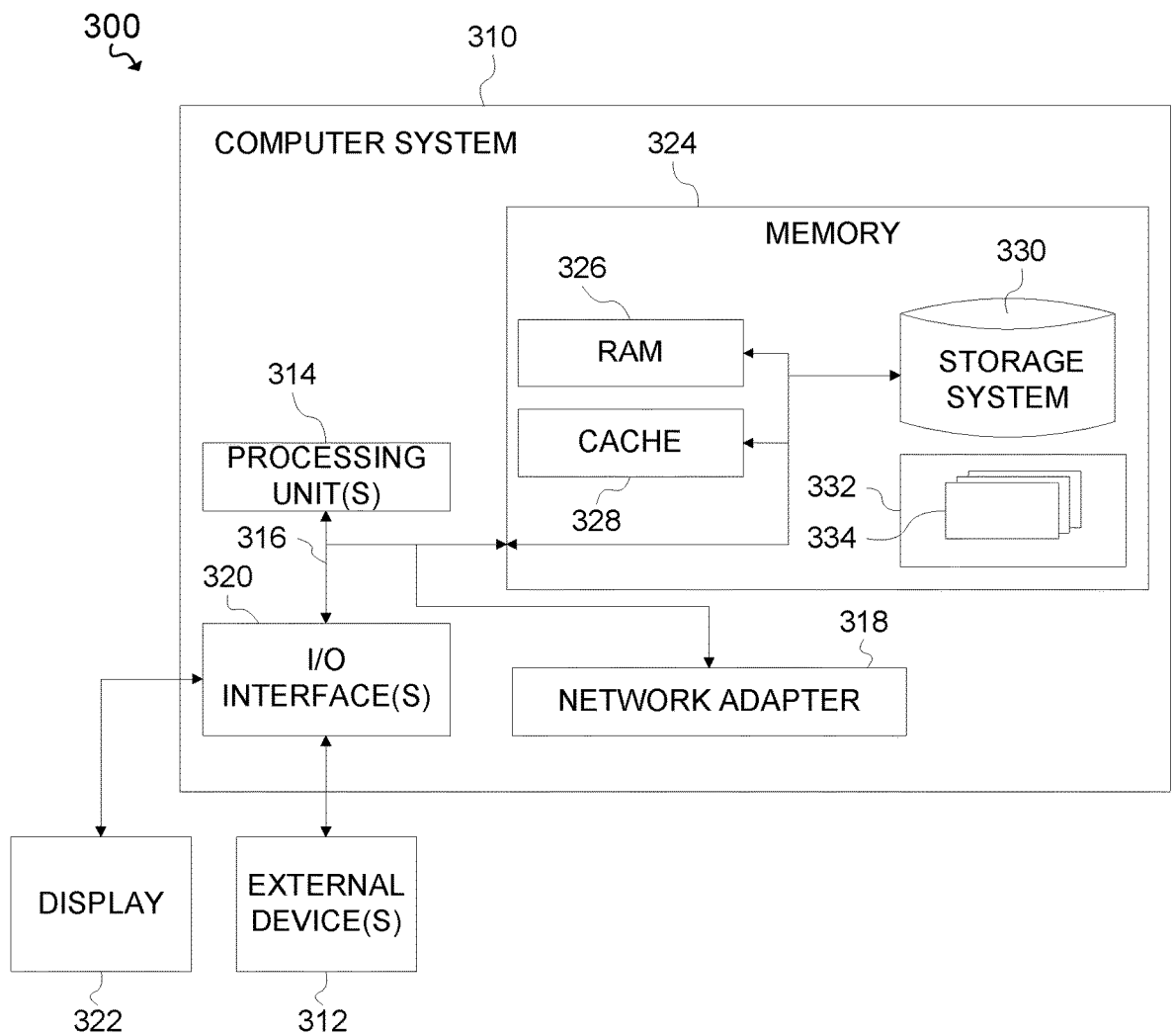
FIG. 3 is a block diagram depicting components of a data processing system (such as the server of FIG. 1), in accordance with an embodiment of the present invention.

FIG. 3 is a block diagram depicting components of a data processing environment, such as server 104 of data processing environment 100, generally designated 300, in accordance with an embodiment of the present invention. FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit 314, memory 324, and bus 316 that couples various system components including memory 324 to processing unit 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

What is claimed is:

1. A method for generating an index in Darwin Information Typing Architecture (DITA) source files, the method comprising:
   determining, by one or more computer processors, one or more similar index entries of a prioritized index;
   determining, by one or more computer processors, whether a fraternal association exists between at least two of the one or more similar index entries, wherein determining whether the fraternal association exists includes grouping one or more similar low priority index entries within a prioritized index of low priority index entries respective to a Darwin Information Typing Architecture (DITA) schema, and determining a fraternal association exists between at least two of the one or more similar index entries when at least one of the one or more similar index entries occur with one or more similar high priority index entries;
   responsive to a determination that a fraternal association exists between at least two of the one or more similar index entries, determining, by one or more computer processors, whether an inheritance from a parent exists; and
   determining, by one or more computer processors, based, at least in part, on whether a fraternal association exists and whether an inheritance from a parent exists, a DITA index.

2. The method of claim 1 further comprises:
   retrieving, by one or more computer processors, one or more files, wherein one or more files comprise one or more DITA source files, one or more variable files, and a DITAMAP file.

3. The method of claim 2, wherein one or more files includes a selection of tokenized gerund and noun information and command information, wherein the selection can be a default tokenized selection, a pre-defined tokenized selection, or a user defined tokenized selection, wherein gerund and noun information and command information comprises nouns, verbs, and gerunds.

4. The method of claim 1 further comprises:
   determining, by one or more computer processors, a gerund-noun listing based, at least in part, on one or more files;
   determining, by one or more computer processors, DITA data of the one or more files, wherein DITA data comprises DITA schema, gerund and noun information of the one or more files, and command information of the one or more files, wherein DITA schema comprises one or more concept topic type files, one or more task topic type files, and one or more reference topic type files; and collating, by one or more computer processors, gerund and noun information of the one or more files and command information of the one or more files.

5. The method of claim 1 further comprises:
determining, by one or more computer processors, the prioritized index of a gerund-noun listing;
designating, by one or more computer processors, each noun as a high priority index entry and a plurality of verbs, gerunds, and commands as low priority index entries for one or more concept topic type files;
designating, by one or more computer processors, a plurality of verbs and gerunds as high priority index entries and a plurality of nouns and commands as low priority index entries for one or more task topic type files; and
designating, by one or more computer processors, a plurality of commands as high priority index entries and a plurality of verbs, gerunds, and nouns as low priority index entries for one or more reference topic type files.

6. The method of claim 1, wherein determining whether an inheritance from a parent exists, further comprises:
determining, by one or more computer processors, one or more fraternally associated one or more similar index entries inherit from a parent within a DITAMAP file.

7. The method of claim 1 further comprises:
responsive to determining at least two of the one or more similar index entries are not fraternally associated, assigning, by one or more computer processors, a value to the one or more similar index entries, wherein the value comprises a tertiary index entry;
responsive to determining at least two of the one or more similar index entries are fraternally associated and the one or more similar index entries inherit from a parent, assigning, by one or more computer processors, a value to the one or more similar index entries, wherein the value comprises a primary index entry; and
responsive to determining at least two of the one or more similar index entries are fraternally associated and the one or more similar index entries do not inherit from a parent, assigning, by one or more computer processors, a value to the one or more similar index entries, wherein the value comprises a secondary index entry.

8. A computer program product for generating an index in Darwin Information Typing Architecture (DITA) source files, the computer program product comprising:
one or more computer readable storage devices and program instructions stored on the one or more computer readable storage devices, the program instructions comprising:
program instructions to determine one or more similar index entries of a prioritized index;
program instructions to determine whether a fraternal association exists between at least two of the one or more similar index entries, wherein determining whether the fraternal association exists includes grouping one or more similar low priority index entries within a prioritized index of low priority index entries respective to a Darwin Information Typing Architecture (DITA) schema, and determining a fraternal association exists between at least two of the one or more similar index entries when at least one of the one or more similar index entries occur with one or more similar high priority index entries;
responsive to a determination that a fraternal association exists between at least two of the one or more similar index entries, program instructions to determine whether an inheritance from a parent exists; and
program instructions to determine based, at least in part, on whether a fraternal association exists and whether an inheritance from a parent exists, a DITA index.

9. The computer program product of claim 8, further comprises:
program instructions to retrieve one or more files, wherein one or more files comprise one or more DITA source files, one or more variable files, and a DITAMAP file.

10. The computer program product of claim 9, wherein one or more files includes a selection of tokenized gerund and noun information and command information, wherein the selection can be a default tokenized selection, a pre-defined tokenized selection, or a user defined tokenized selection, wherein gerund and noun information and command information comprises nouns, verbs, and gerunds.

11. The computer program product of claim 8 further comprises:
program instructions to determine a gerund-noun listing based, at least in part, on one or more files;
program instructions to determine DITA data of the one or more files, wherein DITA data comprises DITA schema, gerund and noun information of the one or more files, and command information of the one or more files, wherein DITA schema comprises one or more concept topic type files, one or more task topic type files, and one or more reference topic type files; and
program instructions to collate gerund and noun information of the one or more files and command information of the one or more files.

12. The computer program product of claim 8 further comprises:
program instructions to determine the prioritized index of a gerund-noun listing;
program instructions to designate each noun as a high priority index entry and a plurality of verbs, gerunds, and commands as low priority index entries for one or more concept topic type files;
program instructions to designate a plurality of verbs and gerunds as high priority index entries and a plurality of nouns and commands as low priority index entries for one or more task topic type files; and
program instructions to designate a plurality of commands as high priority index entries and a plurality of verbs, gerunds, and nouns as low priority index entries for one or more reference topic type files.

13. The computer program product of claim 8, wherein program instructions to determine whether an inheritance from a parent exists, further comprises:
program instructions to determine one or more fraternally associated one or more similar index entries inherit from a parent within a DITAMAP file.

14. The computer program product of claim 8, further comprises:
responsive to determining at least two of the one or more similar index entries are not fraternally associated, program instructions to assign a value to the one or more similar index entries, wherein the value comprises a tertiary index entry;
responsive to determining at least two of the one or more similar index entries are fraternally associated and the one or more similar index entries inherit from a parent, program instructions to assign a value to the one or more similar index entries, wherein the value comprises a primary index entry; and responsive to determining at least two of the one or more similar index entries are fraternally associated and the one or more similar index entries do not inherit from a parent, program instructions to assign a value to the one or more similar index entries, wherein the value comprises a secondary index entry.

15. A computer system for generating an index in Darwin Information Typing Architecture (DITA) source files, the computer system comprising:
   one or more computer processors;
   one or more computer readable storage devices;
   program instructions stored on at least one of the one or more computer readable storage devices for execution by at least one of the one or more computer processors, the program instructions comprising:
   program instructions to determine one or more similar index entries of a prioritized index;
   program instructions to determine whether a fraternal association exists between at least two of the one or more similar index entries, wherein determining whether the fraternal association exists includes grouping one or more similar low priority index entries within a prioritized index of low priority index entries respective to a Darwin Information Typing Architecture (DITA) schema, and determining a fraternal association exists between at least two of the one or more similar index entries when at least one of the one or more similar index entries occur with one or more similar high priority index entries;
   responsive to a determination that a fraternal association exists between at least two of the one or more similar index entries, program instructions to determine whether an inheritance from a parent exists; and
   program instructions to determine based, at least in part, on whether a fraternal association exists and whether an inheritance from a parent exists, a DITA index.

16. The computer system of claim 15 further comprises:
   program instructions to determine the prioritized index of a gerund-noun listing;
   program instructions to designate each noun as a high priority index entry and a plurality of verbs, gerunds, and commands as low priority index entries for one or more concept topic type files;
   program instructions to designate a plurality of verbs and gerunds as high priority index entries and a plurality of nouns and commands as low priority index entries for one or more task topic type files; and
   program instructions to designate a plurality of commands as high priority index entries and a plurality of verbs, gerunds, and nouns as low priority index entries for one or more reference topic type files.

17. The computer system of claim 15 further comprises:
   responsive to determining at least two of the one or more similar index entries are not fraternally associated, program instructions to assign a value to the one or more similar index entries, wherein the value comprises a tertiary index entry;
   responsive to determining at least two of the one or more similar index entries are fraternally associated and the one or more similar index entries inherit from a parent, program instructions to assign a value to the one or more similar index entries, wherein the value comprises a primary index entry; and
   responsive to determining at least two of the one or more similar index entries are fraternally associated and the one or more similar index entries do not inherit from a parent, program instructions to assign a value to the one or more similar index entries, wherein the value comprises a secondary index entry.

* * * * *